(12) United States Patent
Pourchet et al.

(10) Patent No.: US 8,893,463 B2
(45) Date of Patent: Nov. 25, 2014

(54) PICK-UP

(75) Inventors: Jérémy Pourchet, Gilley (FR); Etienne Josset, Arc les Gray (FR)

(73) Assignee: Deere & Company, Moline, IL (US)

( * ) Notice: Subject to any disclaimer, the term of this patent is extended or adjusted under 35 U.S.C. 154(b) by 1490 days.

(21) Appl. No.: 12/087,647

(22) PCT Filed: Dec. 21, 2006

(86) PCT No.: PCT/EP2006/070097
§ 371 (c)(1),
(2), (4) Date: Mar. 31, 2009

(87) PCT Pub. No.: WO2007/082624
PCT Pub. Date: Jul. 26, 2007

(65) Prior Publication Data
US 2009/0320434 A1  Dec. 31, 2009

(30) Foreign Application Priority Data
Jan. 11, 2006  (DE) .................... 10 2006 001 338

(51) Int. Cl.
*A01D 89/00*  (2006.01)
(52) U.S. Cl.
CPC ................. *A01D 89/002* (2013.01)
USPC ........................................................ 56/364
(58) Field of Classification Search
USPC ............ 56/130, 132, 341, 364, 372, DIG. 20, 56/DIG. 24
See application file for complete search history.

(56) References Cited

U.S. PATENT DOCUMENTS

| 1,877,519 | A | * | 9/1932 | MacGregor | 56/364 |
| 2,527,887 | A | * | 10/1950 | Martin | 56/364 |
| 2,880,564 | A | * | 4/1959 | Degenhardt | 56/364 |
| 3,226,921 | A | | 1/1966 | Shepley | |

(Continued)

FOREIGN PATENT DOCUMENTS

WO   WO 2007/082624    7/2007

OTHER PUBLICATIONS

International Search Report, Mar. 27, 2007, 9 Pages.

*Primary Examiner* — Thomas B Will
*Assistant Examiner* — Mai Nguyen

(57) ABSTRACT

The invention pertains to a pick-up (10) with a frame (12), with at least one tine carrier (26) that can be moved relative to the frame (12), with tines (14) that are fastened on the tine carrier (26) and with strippers (30) that are arranged adjacent to one another transverse to the forward direction (V) and between which are formed intermediate spaces (28) through which the tines (14) extend outward and along which the tines (14) can be moved, wherein the strippers (30) feature a first end that is detachably fastened on the frame (12) and a second end that is detachably fastened on the frame (12), and wherein the strippers (30) are connected to the frame (12) at the first end by means of two form-fitting connections (56, 62, 38, 58). It is proposed that the strippers (30) be inherently rigid and respectively connected to the frame (12) at their second end by means of a force-fitting connection.

4 Claims, 4 Drawing Sheets

(56) References Cited

U.S. PATENT DOCUMENTS

Figure 1:
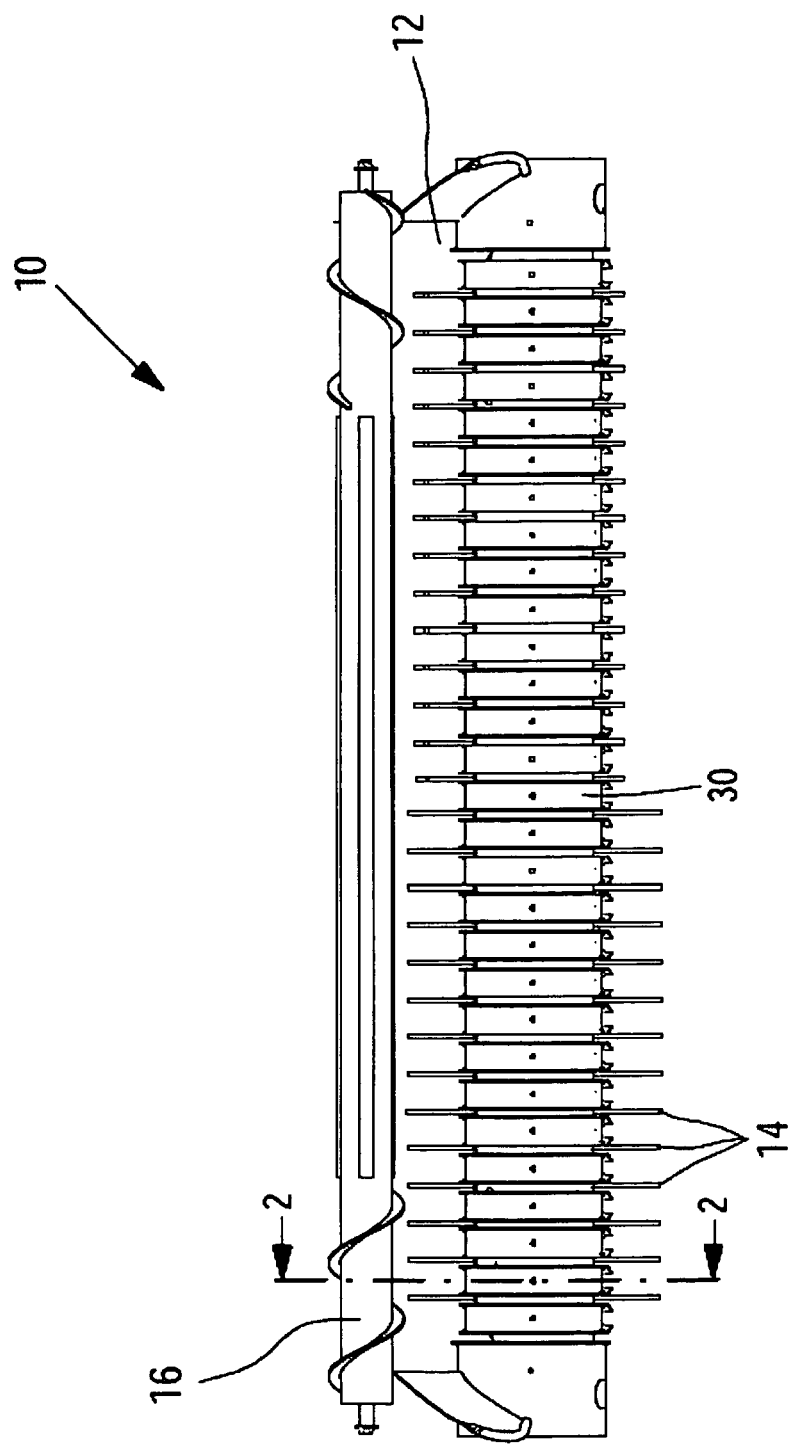

| | | | |
|---|---|---|---|
| 3,613,345 A * | 10/1971 | Cofer | 56/364 |
| 3,713,283 A * | 1/1973 | Fritz | 56/364 |
| 4,161,859 A * | 7/1979 | Storm et al. | 56/364 |
| 5,052,171 A * | 10/1991 | Bich et al. | 56/364 |
| 6,314,709 B1 | 11/2001 | McClure | |
| 6,651,418 B1 * | 11/2003 | McClure et al. | 56/341 |
| 2004/0011016 A1 * | 1/2004 | McClure et al. | 56/341 |
| 2007/0107402 A1 * | 5/2007 | McClure et al. | 56/14.4 |

* cited by examiner

PICK-UP

The invention pertains to a pick-up with a frame, with at least one tine carrier that can be moved relative to the frame, with tines that are fastened on the tine carrier and with strippers that are arranged adjacent to one another transverse to the forward direction and between which are formed intermediate spaces through which the tines extend outward and along which the tines can be moved, wherein the strippers feature a first end that is detachably fastened on the frame and a second end that is detachably fastened on the frame, wherein the strippers are connected to the frame at the first end by means of two form-fitting connections, and wherein the first form-fitting connection fixes the stripper on the frame in both directions that are oriented transverse to its longitudinal direction and the second form-fitting connection fixes the stripper on the frame along its longitudinal direction such that the second connection can be disengaged by moving the stripper transverse to its longitudinal direction and the stripper can be moved relative to the frame in its longitudinal direction and removed from the frame when the second connection is disengaged.

PRIOR ART

Pick-ups are used in agriculture for picking up material lying on a field that may have been previously dried and was deposited in the form of a windrow, as well as for delivering this material to a harvesting machine in which it is pressed into a bale (baling press), deposited (self-loading forage box), chopped (field chopper) or threshed (combine-harvester). Pick-ups of this type usually comprise tines that are arranged on tine carriers extending transverse to the forward direction. The tine carriers are set in motion by either rotating the tine carriers themselves or a central drive shaft connected thereto. The tine carriers can be controlled by cam tracks or cam disks or are uncontrolled. The tines extend outward through intermediate spaces that remain between strippers arranged on the frame of the pick-up and move along these intermediate spaces.

In conventional pick-ups, the strippers are connected to the frame of the pick-up by means of screw connections or rivets (U.S. Pat. No. 3,397,527 A, DD 258 318 A). In order to simplify removal of the strippers, it was proposed to respectively screw the upper and lower ends of several strippers to a lower and an upper plate screwed to the frame of the pick-up rather than directly to the frame (U.S. Pat. No. 5,052,171 A). However, the manufacture of a pick-up still requires a significant expense for producing the multitude of screw connections.

U.S. Pat. No. 1,877,519 A describes another pick-up, in which the upper end of the strippers features a S-shaped tongue that is inserted into a matching slot in the frame. The lower end of the strippers features a slot for accommodating a tongue that extends downward from the frame. A spring pin is inserted into an opening on the underside of the tongue in order to secure the stripper. A special tool is provided for removing the lower end of the stripper from the tongue. Although no screw connections need to be produced in this case, the dimensions of the slots and tongues need to be very accurate in order to avoid undesirable vibratory motions of the strippers relative to the frame.

U.S. Pat. No. 3,613,345 A proposes a pick-up in which the rear ends of the strippers are connected to the frame by means of screw connections. Toward the front, the strippers feature pins that penetrate into suitable openings in elements connected to the frame. Although the pins stabilize the mounting of the strippers, a significant expense is still required for producing the screw connections.

U.S. Pat. No. 3,266,921 A describes a pick-up of the initially cited type, the strippers of which feature two openings in the two ends. The rear opening is elongated and has larger lateral dimensions at its rear end than at its front end. Holders connected to the frame of the pick-up feature a front pin and a rear pin that is provided with a head. This arrangement makes it possible to place the rear openings of the strippers over the head of the rear pin. The stripper is then pulled forward such that the front pins of the holders penetrate into the front openings of the strippers and the heads of the rear pins rest against the edges of the rear openings of the strippers from outside. This means that the strippers are fixed in the longitudinal direction of the strippers and in the lateral direction by the front pins and in the vertical direction and in the lateral direction by the rear pins. The connections therefore can be disengaged without tools. However, since both ends of the strippers are fixed in the described fashion, the stripper needs to have a sufficient inherent flexibility in order to produce and disengage the connections. Due to the lack of a permanent mounting, however, this may cause the strippers to separate from the frame if vibrations occur, e.g., shocks while driving over obstacles.

OBJECTIVE

The invention is based on the objective of making available a pick-up whose strippers can be mounted not only without significant effort, but also in a sufficiently reliable fashion.

According to the invention, this objective is attained with the characteristics of Claim 1, wherein the other claims disclose characteristics for realizing advantageous additional developments of the invention.

The pick-up conventionally features a frame and a movable tine carrier supported thereon, wherein said tine carrier may be controlled or uncontrolled and carries tines. The frame is also connected to strippers that are arranged adjacent to one another in a lateral direction, i.e., in a direction extending transverse to the forward direction of the pick-up, such that intermediate spaces remain therebetween. The tines extend outward through the intermediate spaces and move along the intermediate spaces. At a first end, the strippers are respectively fastened on the frame by means of two form-fitting connections, wherein the first form-fitting connection fixes the stripper on the frame in both directions that are oriented transverse to its longitudinal direction and the second form-fitting connection fixes the stripper on the frame along its longitudinal axis. The second connection can be disengaged by moving the stripper transverse to its longitudinal direction. The stripper can be moved relative to the frame in its longitudinal direction and removed from the frame when the second connection is disengaged. At its second end, the inherently rigid stripper is connected to the frame by means of a force-fitting connection, particularly a screw connection.

Due to these measures, the stripper can be quickly and easily detached from and reattached to the frame at its first end. Since the stripper is inherently rigid and fastened on the frame in a force-fitting fashion at its second end, there is no fear that the stripper can separate from the frame at the first end due to vibrations or shocks occurring during operation.

The first form-fitting connection preferably features a one-part or multipart element that encloses the stripper from four sides and is connected to the frame. It is unnecessary to provide the stripper with special features with which the element would cooperate.

The second form-fitting connection may feature a pin and an opening into which the pin can penetrate. In this respect, it is inconsequential whether the pin is arranged on the stripper or on the frame. The opening is provided either in the frame or in the stripper.

The stripper can be used on agricultural harvesting machines such as, for example, a field chopper, a combine-harvester or a baling press, for example, in the form of a round baler or a square baler.

EMBODIMENT

Figure 2:
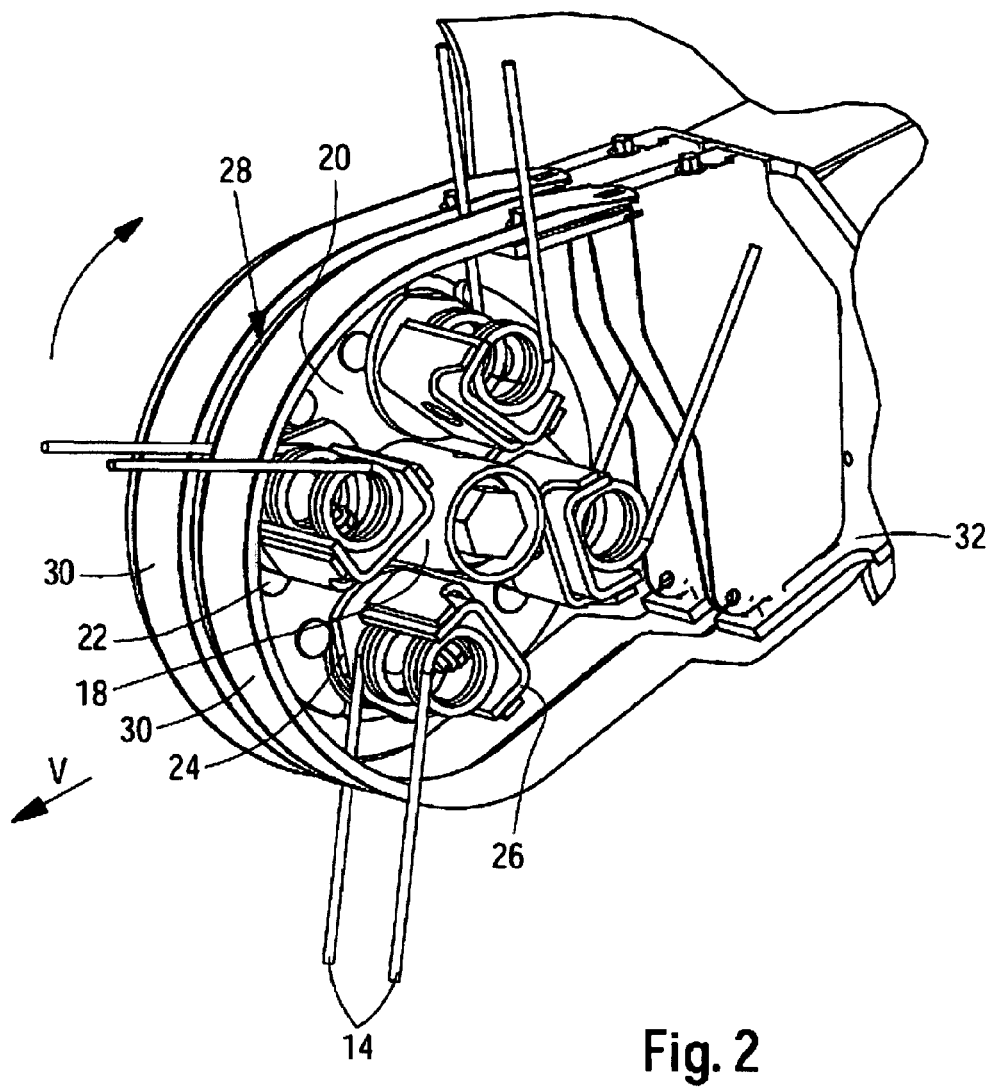
Figure 3:
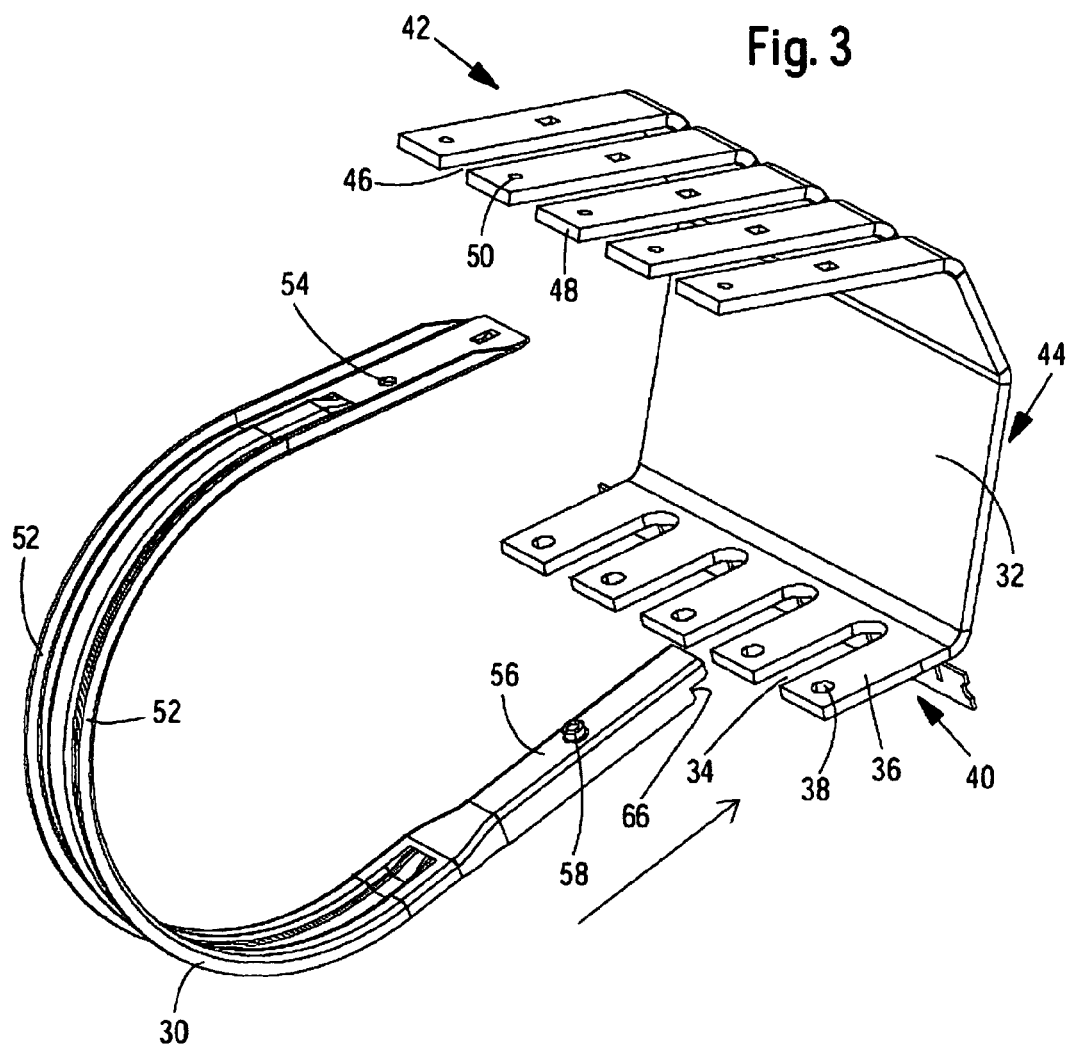
Figure 4:
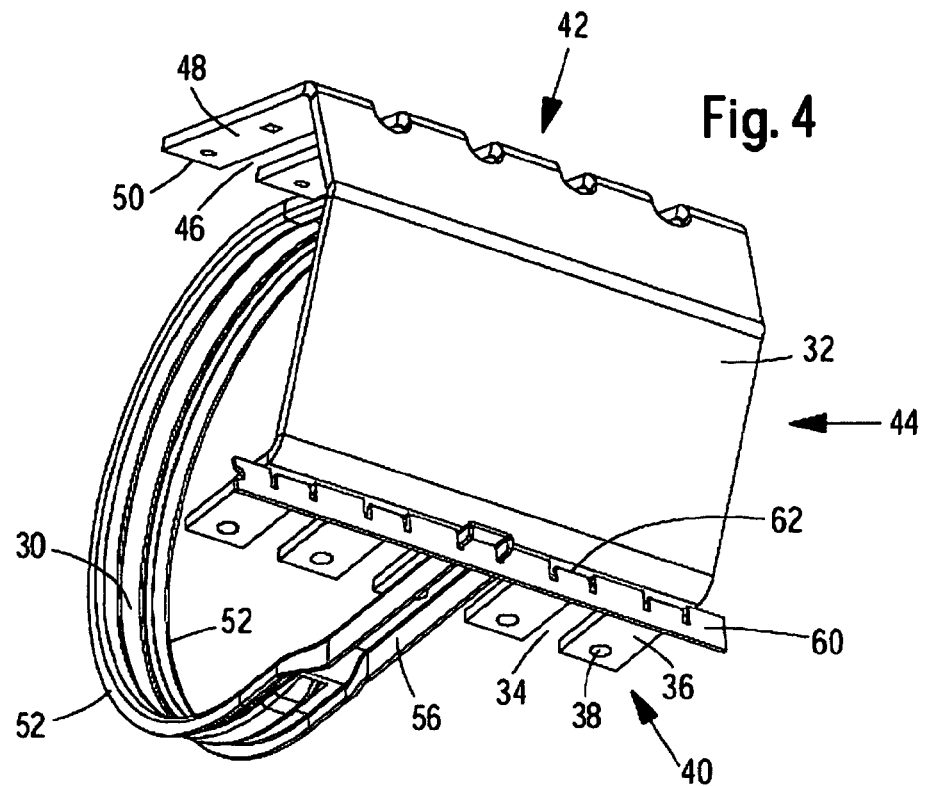
Figure 5:
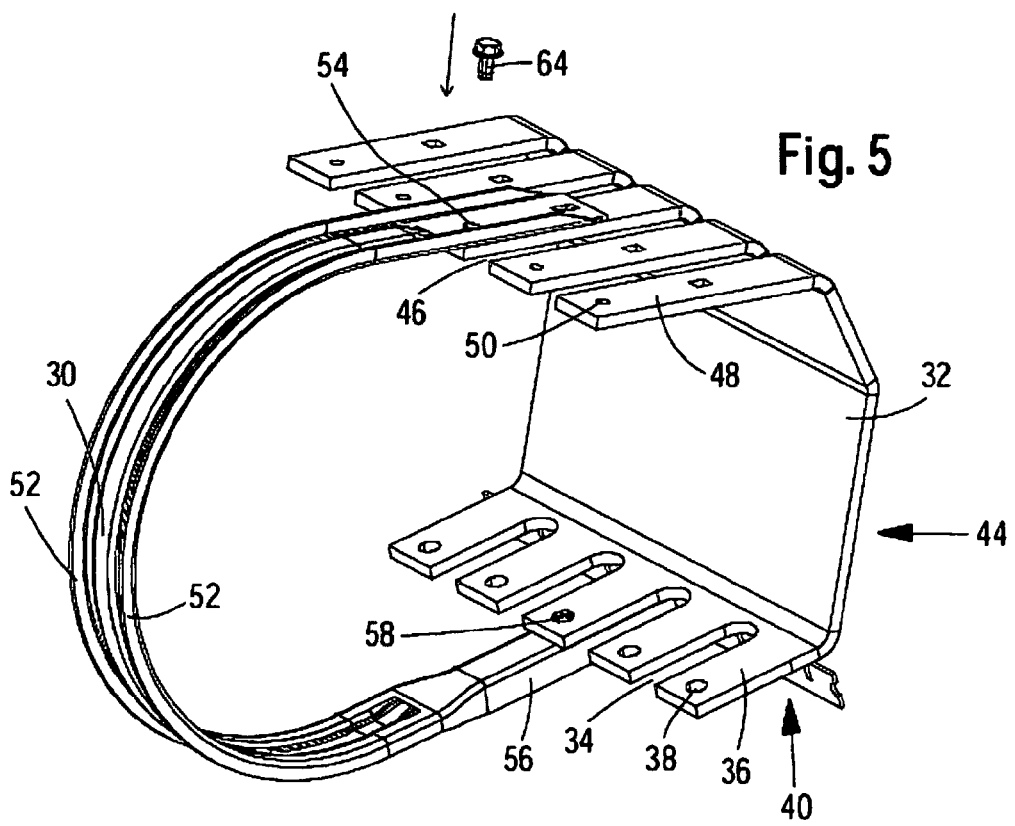

One embodiment of the invention is illustrated in the figures and described in greater detail below. The figures show:

FIG. 1, a front view of a pick-up of an agricultural harvesting machine;

FIG. 2, an oblique representation of the pick-up along the line 2-2 in FIG. 1;

FIG. 3, an oblique representation of a frame part and a stripper in the detached state;

FIG. 4, an oblique bottom view of the frame part, wherein the first end of the stripper is fastened to the frame part, and FIG. 5, an oblique representation of the frame part and the stripper in a position in which the second end of the stripper can be screwed to the frame part.

FIG. 1 shows an oblique front view of a so-called pick-up 10 for material to be harvested that is suitable for use on baling presses, self-loading forage boxes, windrowers, combine-harvesters or field choppers. The pick-up comprises a frame 12. A pick-up rotor with tines 14 is rotatably supported in the frame 12 and preferably can be adjusted with respect to its height above the ground with the aid of said frame. In addition, a hold-down rotor 16 associated with the pick-up 10 is also rotatably supported on the frame 12 and rotates in the opposite direction of the pick-up rotor. In the following description, directional information such as lateral, bottom and top refer to the forward travel direction V of the pick-up 10 that extends upward out of the plane of the paper in FIG. 1 and toward the left front in FIG. 2.

The pick-up rotor comprises a central cylindrical shaft 18 that extends over the width of the pick-up 10 and the ends of which are supported on the frame 12 of the pick-up 10. Several circular holding elements 20 with a multitude of bores 22 that are uniformly distributed about the circumference of the shaft 18 and extend parallel to the shaft 18 are mounted over the length of the shaft 18 such that they are arranged coaxial to the shaft 18. Bearings 24 are arranged in the bores 22. Screws extend axially through the bearings 24, wherein the threads of said screws are screwed into corresponding threads in the ends of U-shaped tine carriers 26 that extend parallel to the shaft 18. The screws and the bearings 24 fix the tine carriers 26 on the holding element 20 such that they are rotatable about their longitudinal axis. Four tine carriers 26 are arranged on each side of the holding element 20.

The tines 14 are made of springy material and are fastened on the tine carriers 26, wherein said tines feature a spiral-shaped section that is connected to the tine carrier 26 and on the end of which outwardly extending sections are provided.

The tines 14 extend through slots 28 that remain between strippers 30 connected to the frame 12 and are designed for gathering and transporting material to be harvested toward the upper rear when the pick-up 10 is driven over a field, on which the material to be harvested usually lies in the form of a windrow. To this end, the shaft 18 is coupled with a drive that sets the shaft in rotation. The tine carriers 26 with the tines 14 are driven by means of the shaft 18, the holding element 20 that is connected to the shaft 18 in a rotationally fixed fashion and the bearings 24, so that they are rotated about the shaft 18. The angular position of the tine carriers 26 relative to the shaft 18 is controlled on the outer ends with the aid of conventional devices (eccentric controls or cams, respectively). However, it would also be conceivable to realize embodiments with uncontrolled tines 14, in which the tine carriers 26 are rigidly fastened to the holding element 20.

FIG. 3 shows an oblique representation of a rear frame part 32 and a stripper 30. The rear frame part 32 is rigidly connected to the frame 12 and forms a U-shaped element, the central limb 44 of which extends almost vertically and forms a rear wall of an interior space containing the tine carriers 26, wherein the front side of this interior space is defined by the strippers 30 and the upper and lower sides of said interior space are defined by the strippers 30 in the front region and by the lower limb 40 and the upper limb 42 of the rear frame part 32 in the rear region. The rear frame part 32 may extend over the width of the pick-up rotor or a section thereof; in the latter instance, several rear frame parts 32 are arranged laterally adjacent to one another. In the embodiment shown, the rear frame part 32 is realized in the form of one part that consists of a bent metal sheet; however, it could also consist of a multipart rear frame part that is composed of individual parts.

The lower limb 40 of the rear frame part 32 is provided with several notches 34 that form a lower rear extension of the slots 28 as shown in FIGS. 3 to 5. Webs 36 are formed between the notches 34, wherein openings 38, which may be realized in the form of punched holes or bores, are provided in the front region of said webs.

The upper limb 42 of the rear frame part 32 is provided with several notches 46 that form an upper rear extension of the slots 28 as shown in FIGS. 3 to 5. Tongues 48 are formed between the notches 48 [sic; 46], wherein threaded bores 50 are provided in the front regions of said tongues.

The strippers 30 have the shape of a circular arc and feature on their lateral edges outwardly directed lateral reinforcing ribs 52 over their entire length in order to provide the strippers 30 with sufficient stability. At their upper ends, the strippers 30 feature an opening 54 that may be realized in the form of a punched hole or bore. At their lower ends, the strippers 30 transform into elongated end sections 56 of U-shaped cross section, on the upper side of which a pin 58 is arranged.

According to FIG. 4, a brace 60 that extends in the lateral direction is arranged on the rear side of the notches 34 underneath the lower limb 40, wherein openings 62 of U-shaped cross section are arranged in said brace. The limbs of the U extend downward analogous to those of the end sections 56.

The strippers 30 are mounted on the rear frame part 32 as shown in FIGS. 3 to 5. After the frame part 32 is fastened on the frame 12 and the shaft 18 with the holding elements 20 and the tine carriers 26 with the tines 14 are fastened on the frame 12, a stripper 30 is positioned in front of the frame part 32 in the alignment illustrated in FIG. 3 and inserted into the opening 62 with the end section 56. In this case, the end section 56 has a more significant downward incline than the web 36 such that the pin 58 does not come into contact with the web 36. Once the stripper 30 is inserted into the opening 62 far enough that a rear edge 66 of the end section 56 rests against the brace 60, the stripper 30 is rotated upward in the clockwise direction. During this process, the pin 58 penetrates into the opening 38 and the upper side of the stripper 30 with the opening 54 is moved downward such that it adjoins the upper side of the corresponding tongue 48. As indicated in FIG. 5, the stripper 30 is ultimately fixed at this location by means of a single screw 64, wherein said screw penetrates into the opening 54 and is fixed in the threaded bore 50. Removal takes place in the reverse sequence.

The U-shaped opening 62 and the end section 56 form a first detachable form-fitting connection that fixes a first (lower) end of the stripper 30 on the frame part 32 in both directions that are oriented transverse to its longitudinal axis, namely in the lateral and the vertical directions. The pin 58 and the opening 38 in the web 36 form a second detachable form-fitting connection between the first end of the stripper 30 and the frame part 32 that fixes the stripper to the frame part 32 in its longitudinal direction (forward direction). The second form-fitting connection also fixes the stripper 30 on the frame part 32 in a second (lateral) direction. The second form-fitting connection can be disengaged (after removing the screw 64) by moving the stripper 30 transverse to its longitudinal direction, namely in the vertical direction, and by rotating the stripper in the counterclockwise direction, respectively. Once the second form-fitting connection is disengaged, the first form-fitting connection can be separated by moving the stripper in its longitudinal direction (i.e., in the forward direction V). The screw 64 forms a force-fitting connection between the second (upper) end of the stripper 30 and the frame part 32.

The form-fitting attachment of the stripper 30 at its first end significantly reduces the time required for mounting and removing the strippers 30 because the number of screws 64 to be tightened and loosened is cut in half in comparison with strippers 30 that are connected with screws at both ends. Since the strippers 30 are relatively rigid and are connected to the frame part 32 in a force-fitting fashion with the aid of the screw 64, vibratory motions at the first end of the stripper 30 that could lead to an undesirable separation of the first end of the stripper 30 from the frame part 32 are not expected.

The invention claimed is:

1. A pick-up with a frame, with at least one tine carrier that can be moved relative to the frame, with tines that are fastened on the tine carrier and with strippers that are arranged adjacent to one another transverse to a forward direction and between which are formed intermediate spaces through which the tines extend outward and along which the tines can be moved, wherein the strippers feature a first end that is detachably fastened on the frame and a second end that is detachably fastened on the frame, wherein:
    the strippers are connected to the frame at the first end by two form-fitting connections, and wherein the first form-fitting connection fixes the stripper on the frame in both directions that are oriented transverse to its longitudinal direction and the second form-fitting connection fixes the stripper on the frame along its longitudinal direction such that the second connection can be disengaged by moving the stripper transverse to its longitudinal direction and the stripper can be moved relative to the frame in its longitudinal direction and removed from the frame when the second connection is disengaged, and
    the strippers are inherently rigid and are respectively connected to the frame at their second end by a force-fitting connection.

2. The pick-up according to claim 1, wherein the strippers are connected to the frame at their second end by means of a screw connection with a screw.

3. The pick-up according to claim 1, wherein the first form-fitting connection features an element that encloses the stripper and is connected to the frame.

4. The pick-up according to claim 1, wherein the second form-fitting connection features a pin and an opening into which the pin penetrates when the connection is engaged.

* * * * *